US005561898A

United States Patent [19]

White et al.

[11] Patent Number: 5,561,898

[45] Date of Patent: Oct. 8, 1996

[54] WIRE INSERTER TOOL

[75] Inventors: Rowland S. White, Lunenburg, Mass.; David E. Ivey, Whitchurch, United Kingdom

[73] Assignee: Mod-Tap W Corporation, Harvard, Mass.

[21] Appl. No.: 325,387

[22] PCT Filed: Apr. 22, 1993

[86] PCT No.: PCT/GB93/00845

§ 371 Date: Oct. 26, 1994

§ 102(e) Date: Oct. 26, 1994

[87] PCT Pub. No.: WO93/22808

PCT Pub. Date: Nov. 11, 1993

[30] Foreign Application Priority Data

Apr. 27, 1992 [GB] United Kingdom .................. 9209069

[51] Int. Cl.[6] ............................ B23P 19/00; H01R 43/00

[52] U.S. Cl. .............................. 29/748; 29/750; 29/566.3

[58] Field of Search ............................ 29/748, 750–753, 29/271, 278, 566.1–566.4, 866; 30/289, 294

[56] References Cited

U.S. PATENT DOCUMENTS

| | | | |
|---|---|---|---|
| 3,611,264 | 10/1971 | Ellis | 439/403 |
| 4,048,710 | 9/1977 | Nijman | 29/753 X |
| 4,306,349 | 12/1981 | Knickerbocker | 29/466.4 |
| 4,784,669 | 11/1988 | Maack | 29/566.4 |
| 5,099,570 | 3/1992 | Gerhard, Jr. | 29/751 |
| 5,195,230 | 3/1993 | Krietzman | 29/751 X |

FOREIGN PATENT DOCUMENTS

| | | |
|---|---|---|
| 3432028 | 3/1985 | Germany . |
| 3803969 | 4/1989 | Germany . |
| 2092485 | 8/1982 | United Kingdom . |
| 2139925 | 6/1984 | United Kingdom . |
| 2177952 | 7/1985 | United Kingdom . |

*Primary Examiner*—Peter Vo
*Assistant Examiner*—Khan V. Nguyen
*Attorney, Agent, or Firm*—Wolf, Greenfield & Sacks P.C.

[57] ABSTRACT

A tool for inserting wires into more than one type of insulation displacement connector comprises a stepped locating device such that a first portion (230) locates in one connector type and a second portion is of a width (W) suitable to locate in a further connector type.

5 Claims, 4 Drawing Sheets

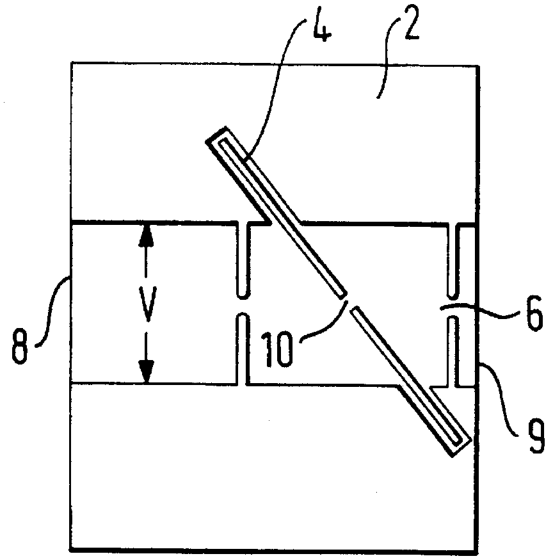
FIG. 1
PRIOR ART
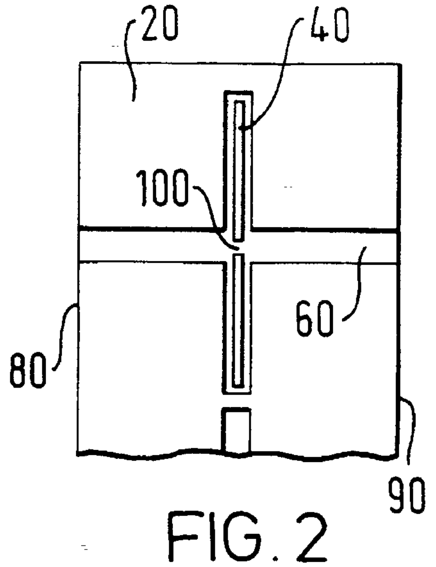
FIG. 2
PRIOR ART
FIG. 4
PRIOR ART
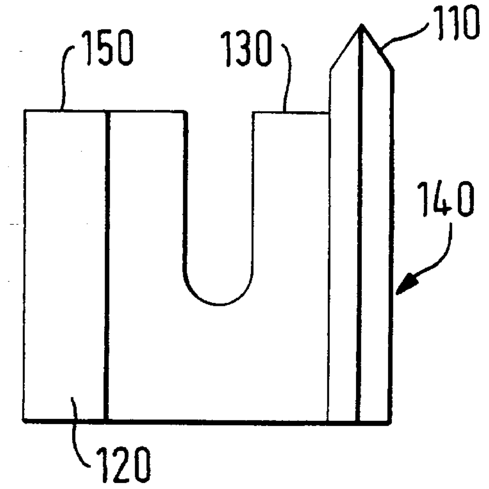
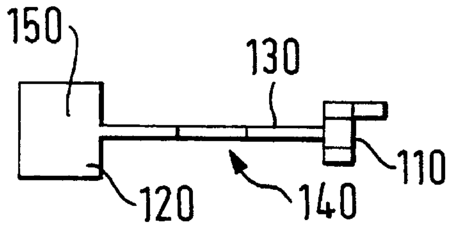
FIG. 3
PRIOR ART
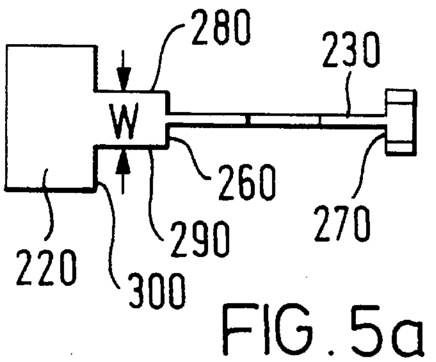
FIG. 5a
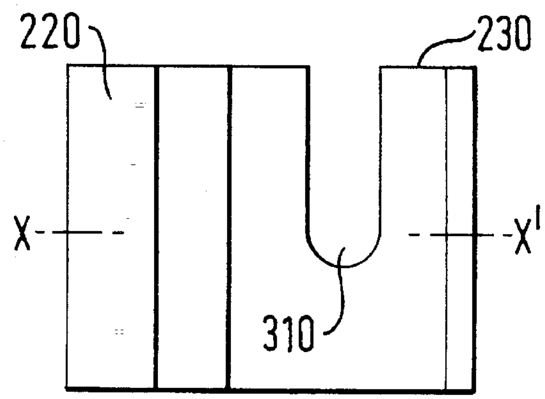
FIG. 6a

WIRE INSERTER TOOL

This invention relates to a tool for inserting wires into an insulation displacement connector having a plurality of insulation displacement contacts, the tool comprising an inserter blade for forcing wires between tines of the contacts, and a locating device to position the tool relative to the connector for insertion of wires. Such a tool is conventionally referred to as a punch-down tool.

Insulation displacement connectors are widely used, particularly in the telecommunications field, and require the wires to be pushed into a fork-shaped metal terminal so that as the wire is forced into the slot of the terminal, the sides of the fork displace the insulation round the wire and contact is made with the terminal. The wire is thus gripped tightly.

To ensure that a proper connection is made, a special tool is used to force the wire into the slot of the terminal. This punch-down tool guides the wire into the slot of the terminal and controls the depth to which it is forced so that the wire is retained correctly and not pushed so deeply as to sever the wire.

Two types of insulation displacement connector are generally used in the United Kingdom, one being made to the AT&T Inc. standard and the other being made to the specification used in the United Kingdom by British Telecom Plc, and produced originally by Krone GmbH. Separate insertion tools are required for use with these two types of connector. Although the function of the tools is similar, they differ in their locator sections due to differences in connector design. Thus, use of the incorrect tool may damage the connector. As well as risking damage by use of the incorrect tool, it is inconvenient for an engineer to have to carry different types of tool.

The present invention aims to overcome the disadvantages mentioned above.

Accordingly, the invention is characterised in that the locating device has a first portion for locating the tool on a first connector type for insertion of wires therein, and a second portion for locating the tool on a second connector type for insertion of wires therein. This arrangement has the advantage of providing a universal tool which may be used with more than one type of insulation displacement connector.

In a preferred embodiment of the invention there is provided a tool wherein the first portion of the locating device is narrower than the second portion and is arranged between the inserter blade and the second portion. This embodiment relies on the appreciation that the difference between the two types of connector lies in the fact that the inserter tool can be located on the AT&T type of connector with a locator device which is too thin to permit location on the Krone type.

An embodiment of the invention will now be described, by way of example, and with reference to the accompanying drawings in which:

FIG. 1 is a plan of a conventional first connector type;

FIG. 2 is a plan of a conventional second connector type;

FIG. 3 is an end view of a prior art inserter head for use with the connector of FIG. 2;

FIG. 4 is an enlarged side view of the head of FIG. 3;

Figure 5B:
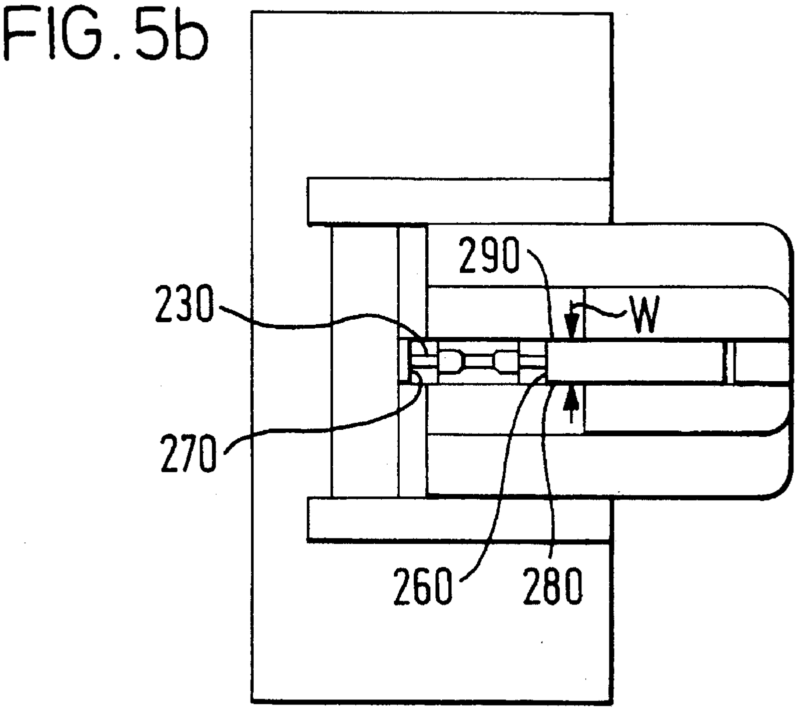

FIG. 5*a* is a schematic end view of an inserter head embodying the invention;

FIG. 5*b* is an end view of a production embodiment of an inserter head embodying the invention;

FIG. 6*a* is a schematic enlarged side view of the head of FIG. 5*a;*

Figure 6B:
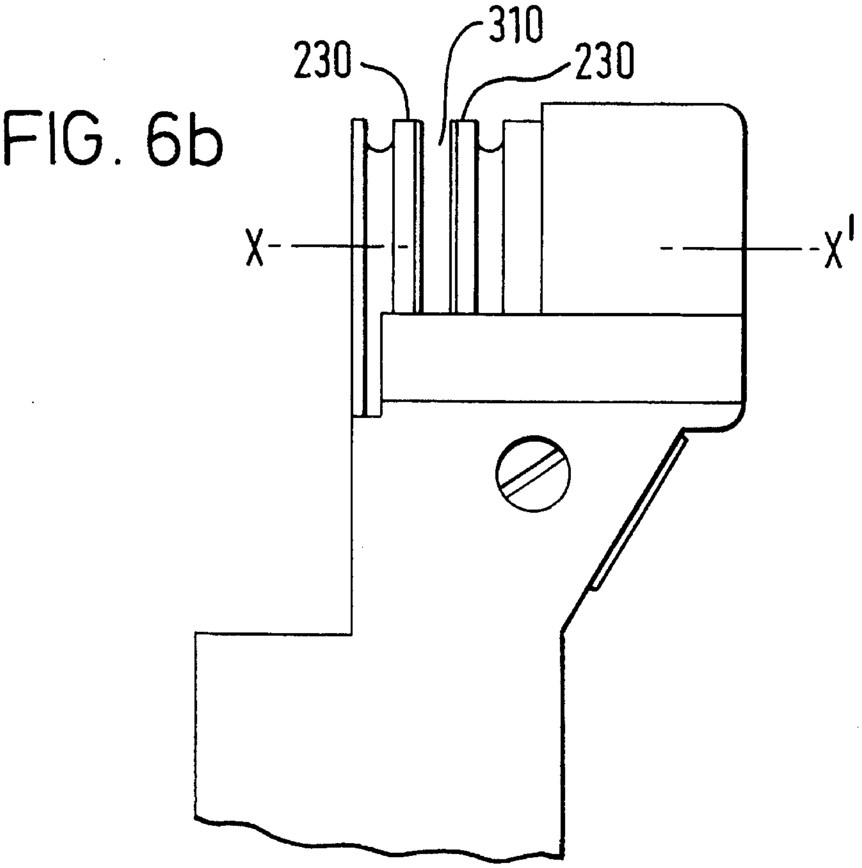

FIG. 6*b* is an enlarged side view of a production embodiment of the head of FIG. 6*a;*

Figure 6C:
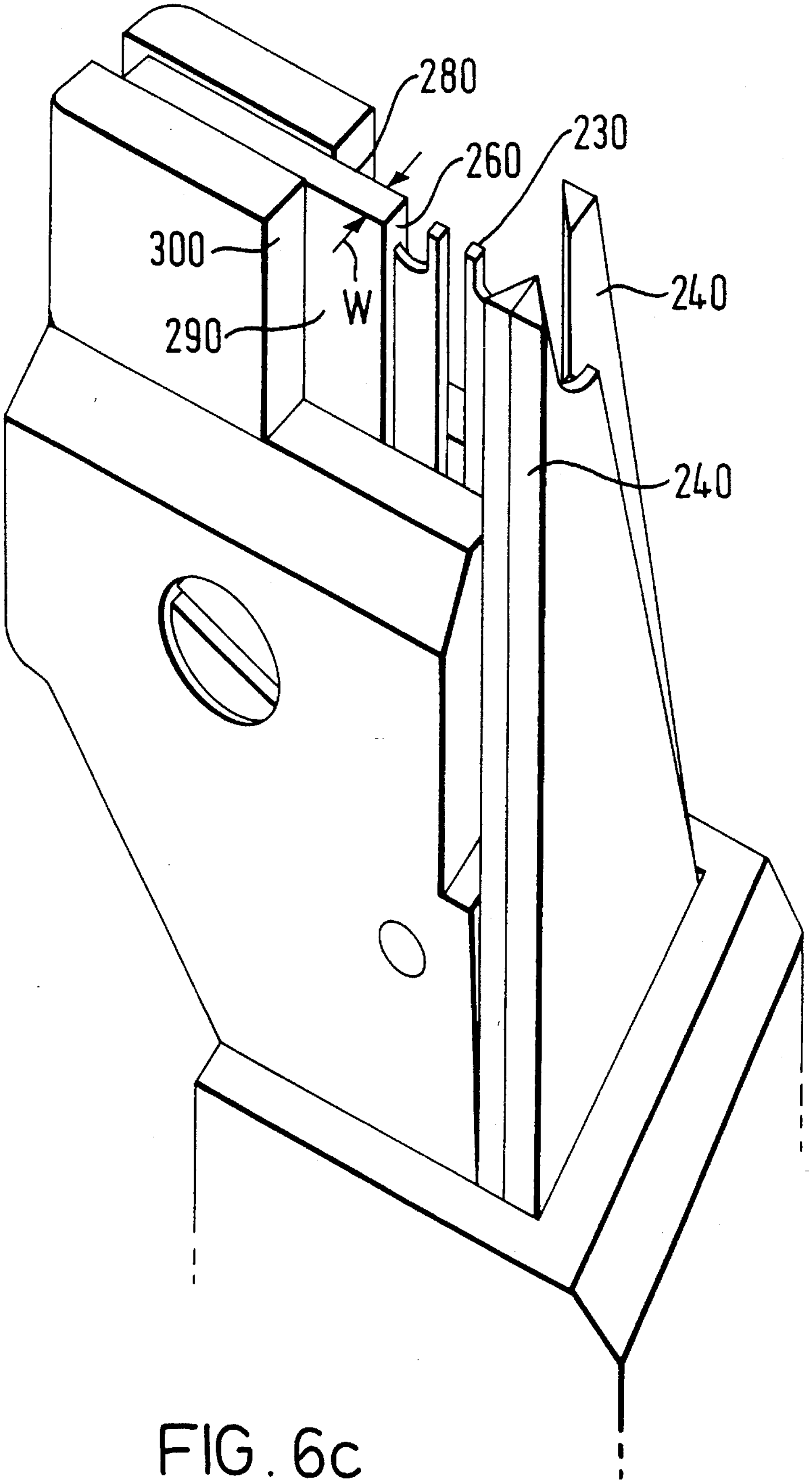

FIG. 6*c* is a perspective side view of a production embodiment of the head of FIG. 5*b;*

Figure 7:
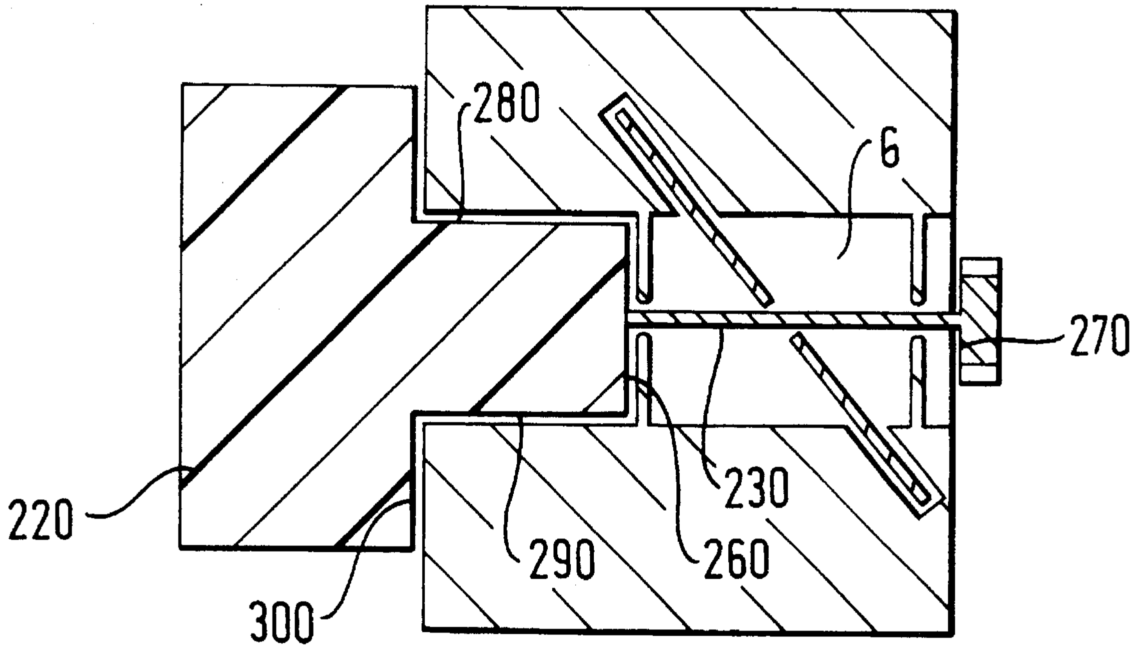
Figure 8:
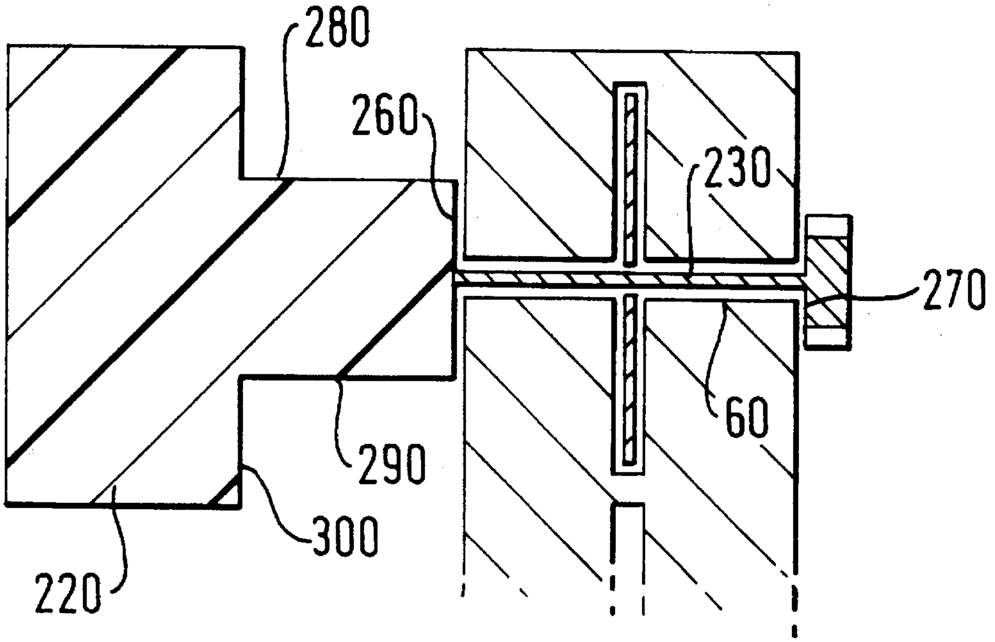

FIG. 7 is a cross-section along the line X—X' of FIGS. 6*a* and 6*b* showing the inserter head in position in a first connector type; and FIG. 8 is a cross-section along the line X—X' of FIGS. 6*a* and 6*b* showing the inserter head in position in a second connector type.

Conventional connectors shown in FIGS. 1 and 2, comprise a plastic moulding or housing (2,20), a channel (6,60) within the plastic moulding, in which the wire to be inserted will lie, and an insulation displacement contact IDC (4,40) positioned in the plastic moulding. The contact (4,40) is housed in the plastic moulding (2,20) substantially perpendicular to the channel (6,60) with a portion of the contact extending into the channel. That portion comprises a pair of tines with a slot between the tines centred on the channel so that a wire may be pushed down into the slot. In so doing, the insulation around the wire is displaced so that the inner conductor of the wire makes contact with the metal tines of the contact (4,40).

There are a number of differences between the first connector type shown in FIG. 1 and the second connector type shown in FIG. 2 and it is these differences which prevent the use of a conventional wire inserter tool specific to the first connector type from being used on the second connector type. These differences are, namely, that the channel (60) in the second connector type is narrower than the channel (6) in the first connector type and the contact (40) in the second connector type is substantially perpendicular to the centre line of the channel (60), whereas the contact (4) in the first connector type is angled to the centre line at substantially 45°. Furthermore, in the second connector type, the contact (40) is substantially equidistant from the ends (80) and (90) of the channel (60), whereas the contact (4) in the first connector type is offset from the centre of the channel (6), towards one end (9) of the channel. However, the distance from the mid-point (10) of the contact (4) in the first type of connector, to the nearer end (9) of the channel (6) is substantially the same as that from the mid-point (100) of the contact (40) in the second connector type to either end (80) or (90) of the channel (60).

The inserter head of a typical wire inserter tool, shown in FIGS. 3 and 4 comprises a wire cutting device (110) at one end of the head, a locating device (120) at the other end of the head, and an inserter blade (130) which is positioned between the two for forcing the wires between the tines of the contacts of an insulation displacement connector, such as that shown in FIG. 2. The locating device (120) locates the inserter head (140) on the connector.

The wire to be inserted is positioned in the channel of a connector and application of a downward force to the inserter head (140) forces the wire between the tines of the contacts of the connector. The wire is pushed to the bottom of the channel (6,60) by the end face (150) of the inserter blade (130). Surplus wire beyond the tines of the contact is severed by the wire cutting device (110) on the inserter head.

A tool designed for use with the first connector is not suitable for use with the second type of connector as its insertion blade is both longer and wider than that of a tool designed for use with the second connector, due differences of dimensions of the channels (6) and (60) as described above. Furthermore, the slot in the inserter blade which is positioned to avoid damage to the tines of the contact, is situated along the central line of the channel (60) in the second type of connector, but is offset along the length of the channel (6) in the first type of connector.

An inserter head embodying the invention, shown in FIGS. 5a, 5b, 6a, 6b and 6c, combines the locating devices of FIGS. 3 and 4 for two different types of connectors into a single locating device (220). The locating device of FIGS. 5a, 5b, 6a, 6b and 6c is stepped to fit both a first connector type and a second connector type, as shown in FIGS. 7 and 8. The inserter blade (230), which comprises the first portion of the stepped locating device, fits the channel (60) in the second connector type such as that shown in FIG. 2. In operation, the slot (310) is centred over the gap (100) in the tines of the contact and the edges of the slot do not interfere with the tines of insertion of the wire.

The spacing between the inner faces (260) and (270) at the ends of the inserter blade (230) is substantially equal to the length of the channel (60), and the width (W) between the outer faces (280) and (290) of the second portion of the stepped locating device is substantially equal to the width (V) of the channel (6) in the first connector-type. Furthermore, the spacing between the face (300) which is normal to the inserter blade (230) and at the base of the second portion of the locating device and the face (270) at the opposite end of the inserter blade is substantially equal to the length of the channel (6) of the first connector type. The dimensions of the inserter head embodying the invention are such that it will fit accurately into two conventional types of connector as shown in FIGS. 7 and 8.

The cross-section along the line X—X' of the inserter head of FIG. 6a embodying the invention, is shown in FIG. 7 as inserted into the first connector type, and in FIG. 8 as inserted into the second connector type. The inserter head shown in FIG. 7 comprises an inserter blade (230) which is located laterally along the channel (6) between the face (300) at the base of the second portion and normal to the inserter blade (230), and the face (270) at the opposite end of the inserter blade (230), and is centred across the channel (6) by the outer faces (280) and (290) of the second portion of the stepped locating device bearing on the sides of the channel. The first portion of the stepped locating device, which is located between the inner faces (260) and (270) at the ends of the inserter blade (230), does not interfere with the sides of the channel (6).

The inserter head shown in FIG. 8 positioned in a second connector type comprises an inserter blade (230) which is located laterally along the channel (60) between the inner faces (260) and (270) at the ends of the inserter blade (230), and is centred across the channel (60) by the first portion of the stepped locating device. The second portion of the stepped locating device, between the outer faces (280) and (290), is now external to the moulding of the second connector type and, as such, has no functional bearing on location.

Various alternatives to the embodiments described are possible and will occur to those skilled in the art. For example, the wire cutting device (110) present in some conventional wire inserter tools and shown in FIG. 2 may be included in a wire cutting device (240) embodying the invention, as shown in FIG. 6c.

More specifically, the invention is defined by the claims to which reference should now be made.

We claim:

1. A tool for inserting wires into insulation displacement connectors of at least a first type and a second type, said connectors of the first type having different dimensions from the connectors of the second type, and each of said connectors having a plurality of tined insulation displacement contacts, the tool comprising an inserter blade for forcing wires between tines of the contacts, and a locating device to position the tool relative to either connector of the first type or the second type for insertion of wires, characterised in that the locating device has a first portion and a second portion, the inserter blade and the first portion having dimensions relative to the dimensions of the first connector type for locating the tool on the first connector type for insertion of wires therein, and the inserter blade, first portion and second portion having dimensions relative to the dimensions of the second connector type for locating the tool on the second connector type for insertion of wires therein, in that said insertion blade, first portion and second portion are arranged in a line with the first portion being between the insertion blade and the second portion, and in that the first portion has a width in a direction normal to the insertion blade which is narrower than that of the second portion.

2. A tool according to claim 1, wherein said insertion blade, first portion and second portion are arranged in a line with the first portion being between the insertion blade and the second portion, and wherein the first portion has a width in a direction normal to the insertion blade which is narrower than that of the second portion.

3. A tool according to claim 1 including a wire cutting device in line with the insertion blade, first portion and second portion and on the side of said insertion blade opposite said first portion.

4. A wire inserter tool for inserting insulated wires into first and second different types of insulation displacement connector each having at least one tined insulation displacement contact, the contact being arranged in a wire insertion channel and the channel of said first insulation displacement connector type having a shorter length and a lesser width than the length and width respectively of the channel of said second insulation displacement connector type, said tool comprising:

an inserter head having an inserter blade for forcing insulated wires between tines of insulation displacement contacts, and having first and second ends, said first end including a first abutment face;

first positioning means for positioning said inserter head on said first connector type; and second positioning means for positioning said inserter head on said second connector type;

said first and said second positioning means and said inserter blade being arranged in-line, said first positioning means adjoining said inserter blade at said second end thereof to define a second abutment face, the distance between the first and second abutment faces being substantially equal to the length of the channel of the first connector type, said second positioning means adjoining said first positioning means at an end remote from the inserter blade to define a third abutment face, the distance between said first and third abutment faces being substantially equal to the length of the channel of the second connector type, the width of the first positioning means perpendicular to the length of the inserter blade being substantially equal to the width of the channel for the second connector type and the width of the second positioning means being greater than the width of the channel for the second connector type.

5. A tool according to claim 4 including a wire cutting device adjacent said first abutment face.

* * * * *